Sept. 3, 1968
J. D. BUCHANAN
3,399,519
DEFLECTABLE ROTARY MOWER BLADE
Filed Feb. 8, 1965
4 Sheets-Sheet 1
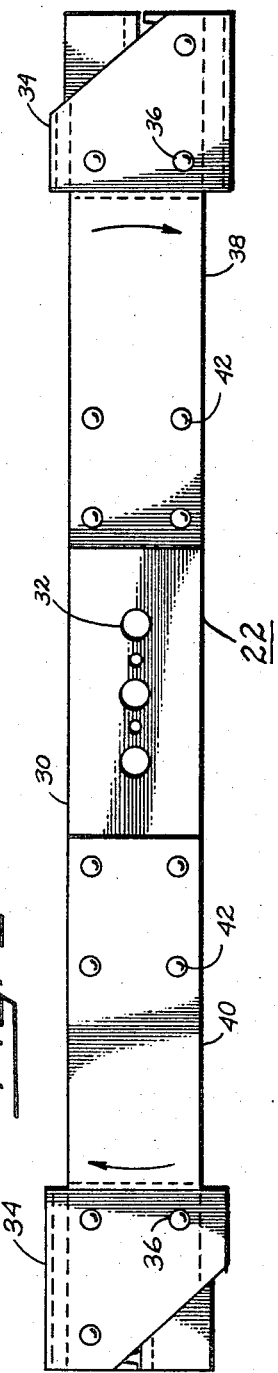
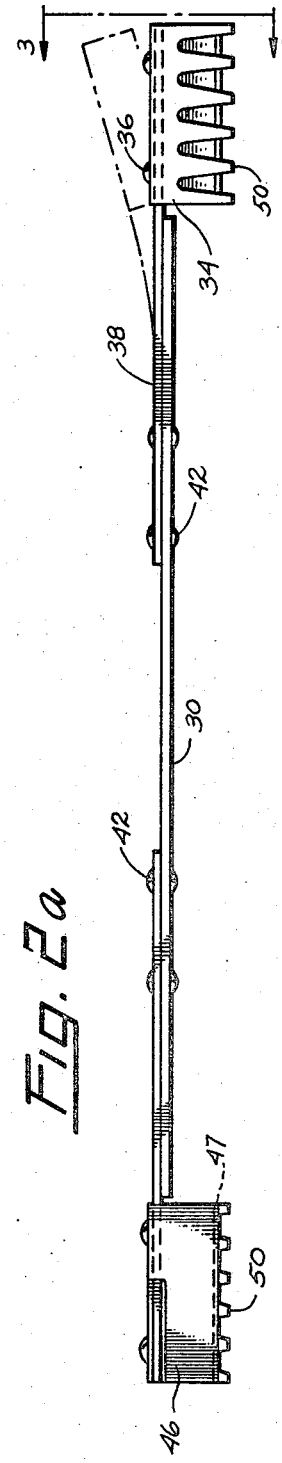
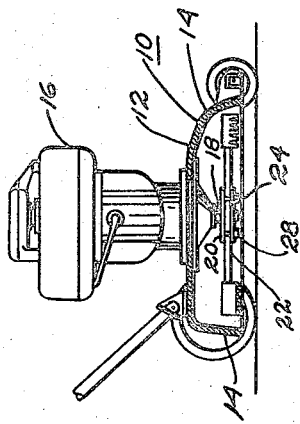
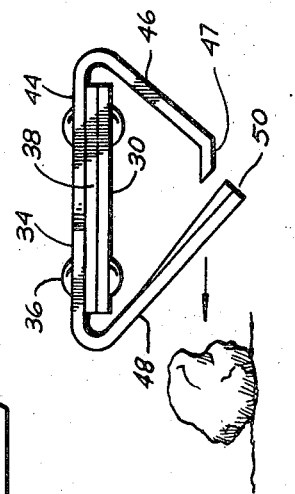
INVENTOR.
JOHN D. BUCHANAN
BY
ATTORNEY Sept. 3, 1968 J. D. BUCHANAN 3,399,519
DEFLECTABLE ROTARY MOWER BLADE
Filed Feb. 8, 1965 4 Sheets-Sheet 2
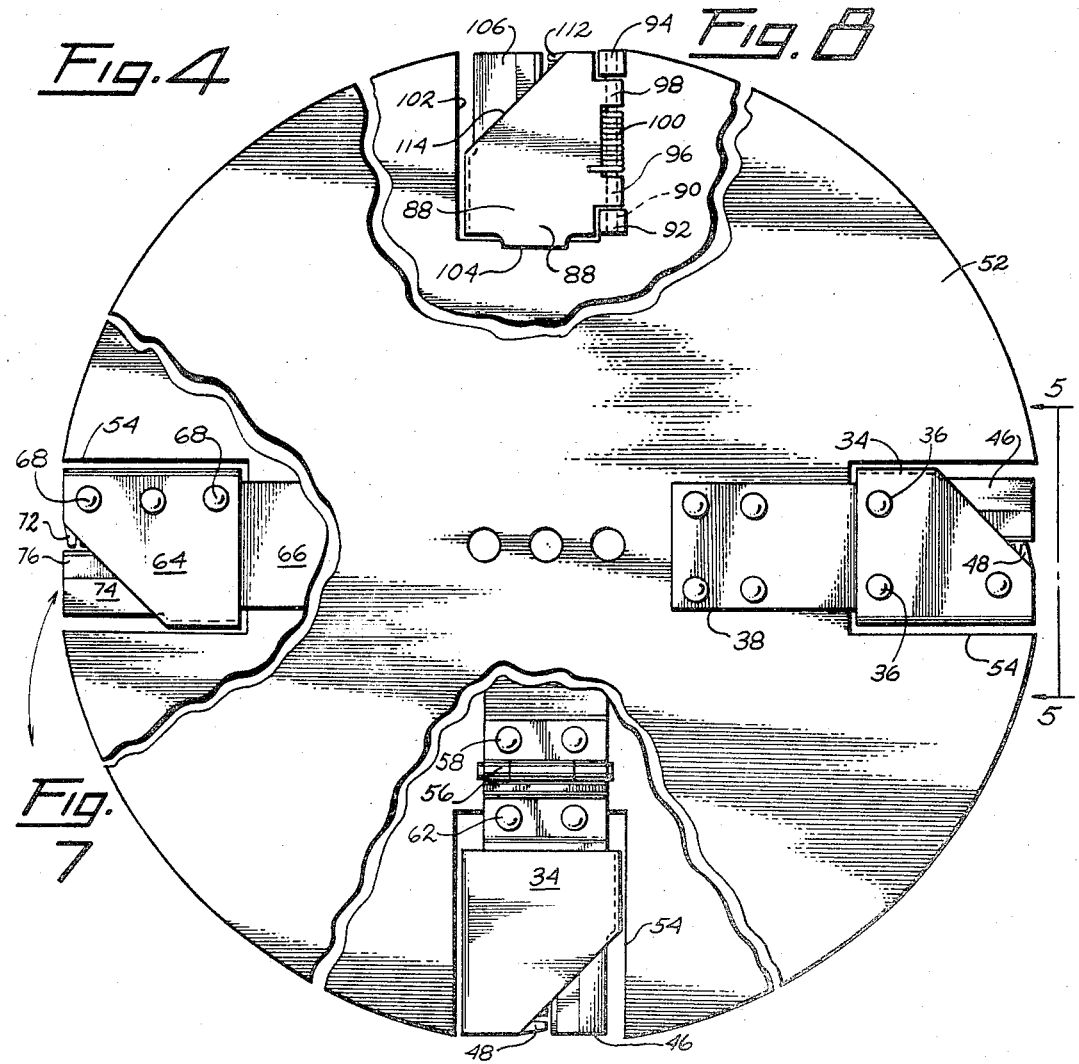
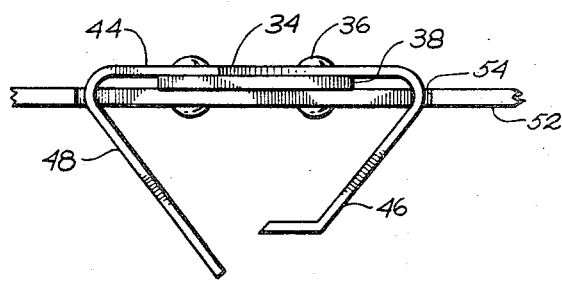
INVENTOR.
JOHN D. BUCHANAN
BY
ATTORNEY Sept. 3, 1968 J. D. BUCHANAN 3,399,519
DEFLECTABLE ROTARY MOWER BLADE
Filed Feb. 8, 1965 4 Sheets-Sheet 3
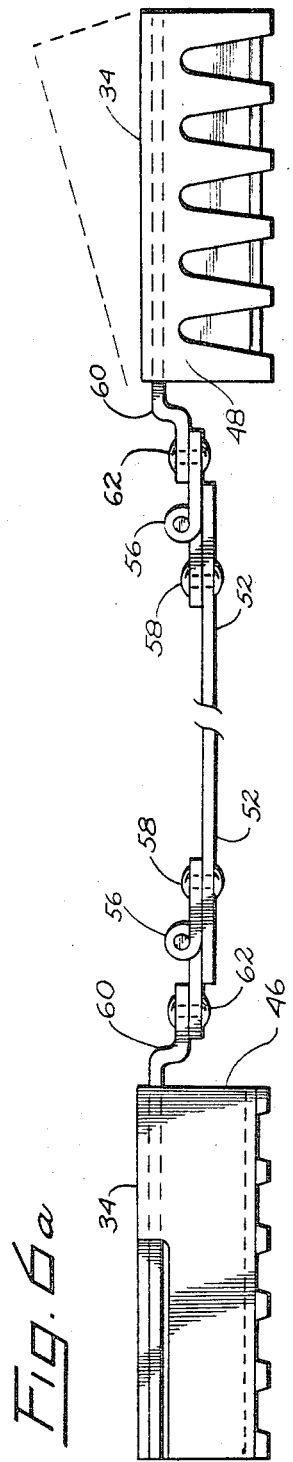
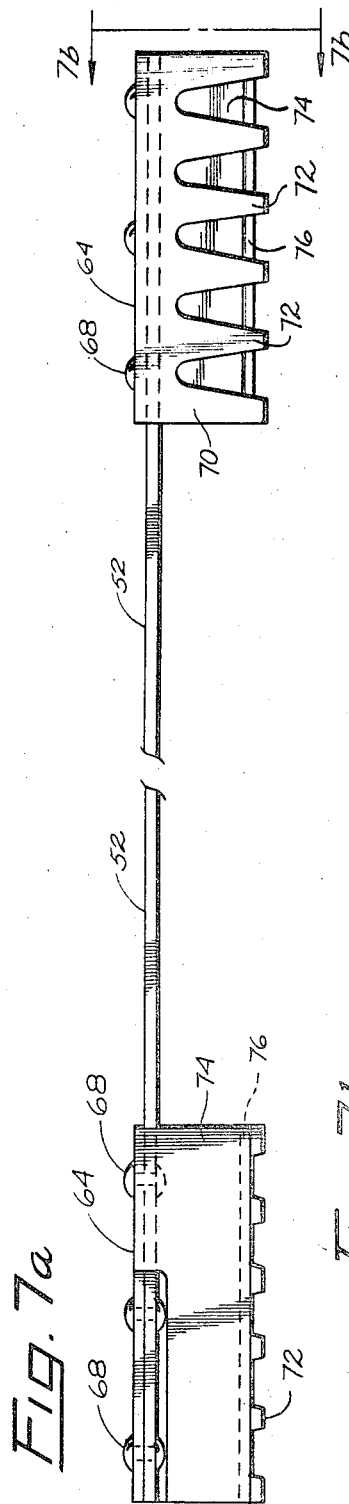
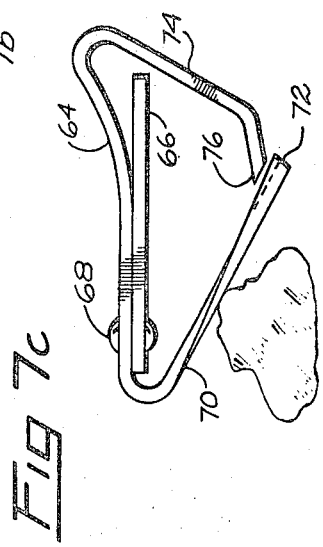
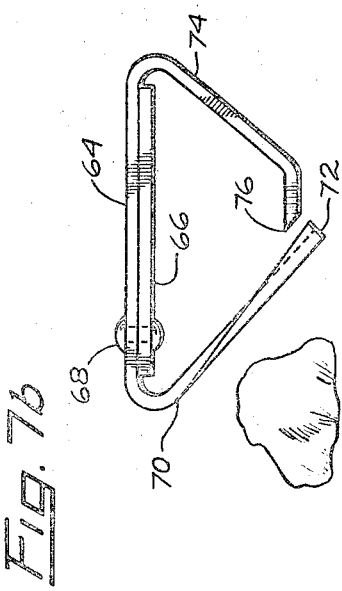
INVENTOR.
JOHN D. BUCHANAN
BY
ATTORNEY

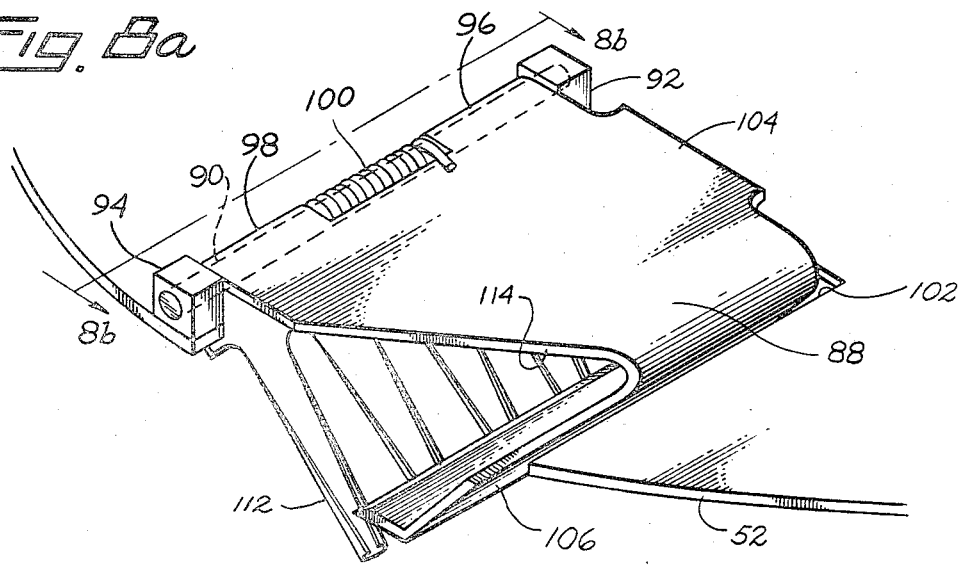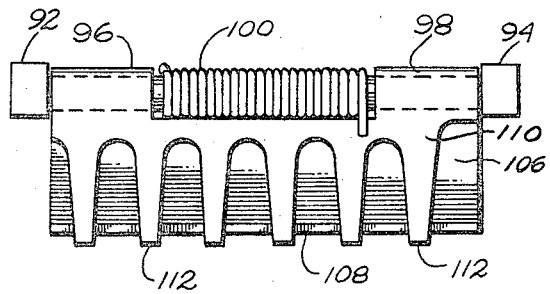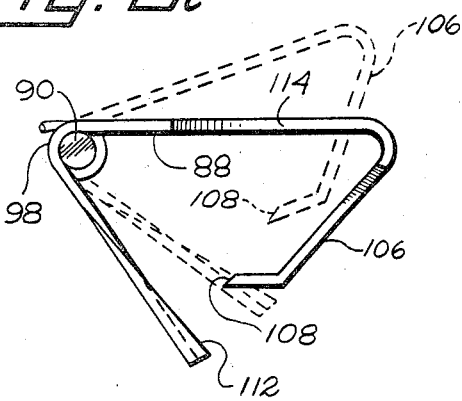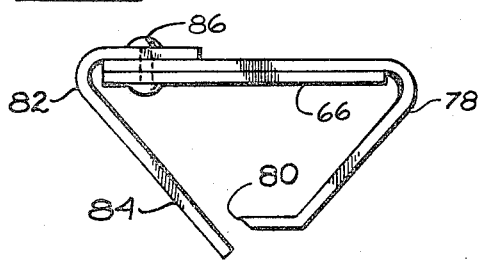

United States Patent Office 3,399,519
Patented Sept. 3, 1968

3,399,519
DEFLECTABLE ROTARY MOWER BLADE
John D. Buchanan, 2123 Eastridge Road,
Timonium, Md. 21093
Filed Feb. 8, 1965, Ser. No. 430,828
10 Claims. (Cl. 56—295)

ABSTRACT OF THE DISCLOSURE

A rotary mower blade including a number of arrangements for yieldably mounting the blade to its supporting structure. A plurality of guard fingers are positioned to precede the cutting blade, and these fingers, upon coming into contact with a heavy object, are deflected and cause the blade to be deflected upwardly out of its normal plane of rotation.

---

This invention relates to lawnmowers and, more specifically, to a unique type of cutting blade for a rotary lawnmower.

The well known rotary type of lawnmower has come into widespread use, despite the existence of recognized hazards connected with its operation, because it can be made light and easily maneuverable in relation to its size and because it is more effective than a reel type mower in cutting tall grass or weeds and in operation on uneven ground or over hills or terraces. This type of mower is especially hazardous, however, because of the speed and resulting high inertia of its blade. Such blades are capable of hurling a stone or other hard object with great speed for a substantial distance, and thus the possibility of inflicting injury with such flying objects is always present. There is also the very real possibility that the operator may inadvertently maneuver the mower in such manner as to bring the blade into contact with his own feet, with resulting serious injury. It is, therefore, an object of the present invention to provide a mowing device which has the recognized advantages of a standard rotary lawnmower but in which the aforementioned dangers in operation are eliminated or minimized.

It is another object of the present invention to provide a cutting blade device suitable for use with a rotary lawnmower which is essentially as durable and permanent as the solid bar or disk types presently in use, yet is designed such that it is easily deflected in the event of a collision with an object having substantial mass.

It is another object of the present invention to provide a deflectable cutting blade device for rotary lawnmower which is adaptable to existing rotary lawnmowers with little or no modification.

It is a further object of the present invention to provide a cutting blade device for rotary lawnmowers which meets the above objects and which is comparatively inexpensive to produce.

Other objects and advantages will become apparent from the following specification taken in connection with the accompanying drawings, in which:

FIGURE 1 is a view, partly in section, of a rotary power mower incorporating one embodiment of my invention.

FIGURE 2 is a plan view of a cutting blade device incorporating my invention.

FIGURE 2a is a front view of the device shown in FIGURE 2.

FIGURE 3 is an end view of the device shown in FIGURES 2 and 2a.

FIGURE 4 is a plan view of an embodiment of my invention similar to that shown in FIGURE 2, but mounted on a circular cutting disk rather than a swinging bar.

FIGURE 5 is an end view of the cutting blade device shown in FIGURE 4.

FIGURE 6 is a plan view of another embodiment of my invention, shown on a broken-away section of a circular cutting disk.

FIGURE 6a is a front view of the embodiment shown in FIGURE 6.

FIGURE 7 is a plan view of a still further embodiment of my invention, shown on a broken-away section of a circular cutting disk.

FIGURE 7a is a front view of the embodiment shown in FIGURE 7.

FIGURE 7b is an end view of the embodiment appearing in FIGURES 7 and 7a.

FIGURE 7c is a view similar to 7b showing the manner in which the device of FIGURE 7 deflects when it comes into contact with a rock or other hard object.

FIGURE 7d shows an end view of a modification of the embodiment shown in FIGURES 7, 7a, 7b and 7c.

FIGURE 8 is a plan view of a still further embodiment of my invention, shown mounted on a broken-away section of a circular cutting disk.

FIGURE 8a is a perspective view of the embodiment shown in FIGURE 8.

FIGURE 8b is a view of the embodiment shown in FIGURE 8a, taken along the lines 8b—8b.

FIGURE 8c shows an end view of the device shown in FIGURES 8, 8a and 8b, and shows in dashed outline the manner in which this embodiment is deflected when it contacts a heavy object.

Referring now to FIGURE 1, a rotary power mower is shown generally at numeral 10. It includes a platform 12 having sides 14 which act as guards. Platform 12 carries a prime mover 16, which is shown as a gasoline engine, but which may also be an electric motor. The output shaft 18 of motor 16 includes a flange 20 to which the center section of a cutting blade 22 is attached by means of a disk 24 having a plurality of holes for receiving bolts 28 which extend into the flange 20.

The cutting blade 22 is shown in plan view in FIGURE 2. It consists of a conventional steel bar 30 having a plurality of holes 32 for receiving the mounting bolts 28. Attached at the outside ends of bar 30 are a pair of blade-carrying devices 34. Blade-carrying devices 34 are fastened by means of a plurality of rivets 36 to each of a pair of resilient mounting members 38 and 40. The members 38 and 40 are fastened to the steel bar 30 by means of rivets 42 which are concentrated toward the inboard side of steel bar 30. The identical blade-carrying devices 34 consist of a center section 44 from which depends a blade-carrying section 46 and a guard section 48 which includes a plurality of guard teeth 50. From consideration of FIGURE 3, it will be apparent that the cutting blade device moves in the direction of the arrow and that the guard teeth 50 would strike a hard object ahead of the cutting blade 47. When the object is struck, the guard teeth 50 are deflected somewhat until they contact the blade 47, whereupon member 34 moves upwardly as shown in FIGURE 2a because of the resilient nature of member 38, which may be formed of spring steel. In the normal grass-cutting operation, the guard teeth 50 move easily through the grass which is subsequently cut by means of blade 47. The grass cuttings are deflected upwardly and outwardly, and the device 34 has been cut out as shown in FIGURE 2 to preclude trapping of cuttings just above and behind the blade 47.

FIGURE 4 shows a cutting blade-carrying device which is essentially the same as that shown in FIGURE 2, but mounted on a circular cutting disk 52 rather than a swinging bar. Because the cutting blade devices themselves are, or may be, identical, they have been given the same numerals. Blade-carrying device 34 is attached by means of rivets 36 to a resilient supporting arm 38. An end view of the structure shown in FIGURE 4 appears in FIGURE 5. The blade-carrying device 34 includes the center section 44 and the depending blade-carrying section 46 and guard section 48 in the same manner as they appear in FIGURE 3. It will be observed that disk 52 is cut out along line 54 to provide clearance for the necessary deflection of the blade-carrying device 34.

Another modification is shown in FIGURE 6, which appears as a broken-away section, in connection with FIGURE 4, and also in FIGURE 6a. FIGURES 6, 7 and 8 all appear in connection with FIGURE 4, since it is obvious that any of these embodiments might be attached to a circular disk such as member 52. The reader will also appreciate that any number of cutting devices per disk might be used. The embodiment shown in FIGURES 6 and 6a is very similar to that of FIGURES 4 and 5 and may be identical, except for its means of attachment to the disk 52. In this embodiment, the cutting blade-carrying device 34 is attached to the cutting blade 52 by means of a hinge shown at 56, said hinge being fastened to disk 52 by means of rivets 58 and to a short, offset arm 60 by means of rivets 62. The blade-carrying device 34 may be fastened to arm 60 by welding or any other suitable means. Arm 60 is offset as shown in the side view 6a in order to locate the center of gravity of the blade-carrying structure outside of hinge 56 slightly above the hinge. This results in the cutting tool being held in the down position by centrifugal force. In the event the guard section 48 strikes an object, the cutting tool device will rotate at the hinge 56 upwardly as shown in the dotted outline.

An additional embodiment of my invention is shown in FIGURE 7, which is also attached to a broken-away section of a disk like that shown at numeral 52. In this embodiment, the cutting blade-carrying device 64 is considerably different from device 34 shown in the preceding embodiments and is attached to a tongue 66 which extends outwardly from a cut-out section 54 of the disk. Blade-carrying device 64 is attached to the tongue 66 by means of a plurality of rivets 68 which are all arranged along a single line which is essentially radial with respect to the rotation of the support member or disk 52. In actuality, rivets 68 may be located along a line parallel to the radius and slightly displaced therefrom, rather than a radius, as shown, and it will be appreciated that when applicant refers herein to a substantially radial line, such a line parallel to a radius is intended to be included. The blade-carrying device 64 is somewhat similar to that shown at numeral 34 in the previously described embodiments, but has certain important differences which will become more apparent from consideration of FIGURES 7a, 7b and 7c. A guard section 70 is included, including a plurality of downwardly extending guard teeth 72. Also included is a blade-carrying section 74 which depends downwardly from the center section of member 64 and which carries the cutting blade 76. FIGURES 7b and 7c are end views of the embodiment shown in FIGURE 7 and show the manner in which the embodiment of FIGURE 7 deflects when placed in contact with a heavy object, such as a rock. It will be observed that the general configuration of blade-carrying device 64, as shown in FIGURE 7b, is very similar to that of device 34, as shown in FIGURE 3 or FIGURE 5. When the device 64 strikes a rock, however, it is itself caused to deform to carry the cutting blade 76 out of the way of the rock, rather than having the entire cutting blade structure moved out of the way through the resilient action of the supporting means. Thus it will be observed that when guard fingers 72 strike the rock, they are caused to bend backward, whereupon they contact the flat edge of the cutting blade 76. This causes the entire blade-carrying section 74 to be deflected upwardly out of the path of the rock, which becomes possible because the entire structure, including the center section of device 64, is made of a resilient material, such as a spring steel. Some materials which I have found useful for the forming of this member are SAE 1075 or 1095 cold rolled, annealed steel, approximately .025 inch thick.

A modification of the FIGURE 7 embodiment is shown in FIGURE 7d. I have found that it is sometimes advantageous to form the blade-carrying structure 64 of two separate parts. This is not because any particular functional advantage is obtained, but simply to aid in manufacture of the structure. In this modification, the extended tongue 66 carries a blade-carrying structure 78 including the blade 80, and the guard section becomes a separate member 82 which may include guard fingers 84 exactly as previously described. Members 78 and 82 are then fastened to tongue section 66 by means of rivets 86 which are placed along a single line to permit deflection of member 78 in the same manner as previously described with respect to the embodiment shown in FIGURES 7, 7a, 7b and 7c.

The embodiment shown in FIGURE 8 is also mounted on a broken-away section of a disk, which may be similar to that shown at numeral 52. The FIGURE 8 embodiment includes a blade-carrying device 88 which is fastened to its mounting disk by means of a hinge pin 90 which passes through a pair of upstanding blocks 92 and 94 which are welded to the disk, a pair of rolled-over sections 96 and 98 forming part of member 88, and a spring 100. The disk in this case is cut out along line 102 to permit the member 88 to pivot upwardly around the hinge pin 90. A stop 104 rests upon the surface of the disk and prevents member 88 from pivoting too far downwardly, thereby holding the blade in normal cutting position. Member 88 also includes a downwardly depending blade-carrying section 106 which carries the blade 108 and also a guard section 110 which carries a plurality of guard fingers 112. Some of these individual parts will be more easily seen in FIGURES 8a, 8b and 8c. It will be observed that member 88 is also cut out along an outside edge to facilitate removal of the grass clippings, as shown at numeral 114.

It will be observed that when the member 88 is in its normal operating position, the spring 100 holds the stop 104 down against the surface of disk 52, and the cutting blade 108 is in its normal cutting position. When member 88 is moved into contact with a heavy obstacle, such as shown in FIGURE 8c, the structure rotates around pin 90 as the guard fingers 112 yieldably contact the object. This causes the blade-carrying structure 106 and blade 108 to move upwardly out of the way of the object, as shown in dashed outline in FIGURE 8c.

It will be appreciated that any of the embodiments described above may be mounted by suitable mounting means on either a swinging bar, as shown in FIGURES 2, 2a and 3, or on a rotating disk, as shown in FIGURE 4 and subsequent figures. It is also apparent that many schemes are available for attaching the various embodiments shown and described herein to the appropriate mounting and supporting structure. Other modifications and embodiments will occur to those skilled in the art, and I do not desire to be limited to the specific details of the embodiments disclosed.

I claim:

1. A cutting member for a rotary grass-cutting machine including a carriage and a prime mover mounted on said carriage for driving said cutting member, said cutting member comprising a supporting structure fastened to said prime mover, and a plurality of blade-carrying devices yieldably attached to said supporting structure to permit vertical movement of at least a portion of said blade-carrying devices, the vertical position of said devices during rotation at all operating speeds normally remaining essentially the same as at rest, each of said devices including a cutting blade, a blade-carrying portion depending downwardly out of the plane of said supporting structure such as to direct said blade in the direction of rotation of said cutting member, and a guard section including a plurality of spaced finger members depending downwardly out of the plane of said supporting structure such that said finger members move in advance of said cutting blade, such that when said guard fingers strike an object having substantial mass the force from said fingers acts against said blade and said blade is deflected upwardly away from said object.

2. A cutting member for a rotary grass-cutting machine as set forth in claim 1 wherein at least one of said supporting structure and blade-carrying devices includes a hinge structure including a pivot pin permitting said one blade-carrying device to be pivoted around said pin upwardly out of the way of said object when said guard fingers are deflected thereby.

3. A cutting member for a rotary grass-cutting machine as set forth in claim 2 wherein the pivot point of said hinge is located with respect to the center of gravity of said blade-carrying device such that centrifugal force causes said device to remain in cutting position unless said guard fingers are deflected by said object.

4. A cutting member for a rotary grass-cutting machine as set forth in claim 1 wherein said supporting structure includes a resilient arm permitting said blade-carrying structure to be deflected upwardly out of the way of said object when said guard fingers contact said object.

5. A cutting member for a rotary grass-cutting machine as set forth in claim 1 wherein said blade-carrying device includes a flat center section fastened to said supporting structure along a single radial line adjacent said guard section only and said device is formed of resilient material such that when said guard fingers strike an object having substantial mass, said fingers are deflected and contact said blade causing said blade to be deflected and a portion of said center section to be deformed upwardly.

6. A cutting member for a rotary grass-cutting machine as set forth in claim 5 wherein said device is formed of two separate parts which are overlapped along said radial line.

7. For use with a rotary power mower having a rotatable driven member, a blade-carrying device including a center section adapted to be yieldably attached to said driven member to permit vertical movement of at least a portion of said blade-carrying device, the vertical position of said device during rotation at all speeds normally remaining essentially the same as at rest, a cutting blade, and a blade-carrying portion depending downwardly out of the plane of said driven member such as to direct said blade in the direction of rotation of said driven member, and a guard section including a plurality of spaced finger members depending downwardly out of the plane of said driven member, such that said finger members move in advance of said cutting blade such that when said guard fingers strike an object having substantial mass, the force from said fingers is transferred to said blade to cause said blade to be deflected upwardly away from said object.

8. A blade-carrying device as set forth in claim 7 wherein said center section is fastened to said driven member along a single substantially radial line and is formed of a resilient material such that when said guard fingers strike said object said fingers are deflected and contact said blade causing said blade and a portion of said center section to be deflected upwardly.

9. A blade-carrying device as set forth in claim 8 wherein said device includes a first piece including said guard section and a second piece including said blade-carrying portion, said first and second pieces being overlapped along said radial line.

10. A blade-carrying device as set forth in claim 7 wherein said center section includes a hinge structure with a pivot member for attaching said device to said driven member, permitting said blade-carrying device to be pivoted upwardly around said pivot member when said guard fingers contact said object.

References Cited
UNITED STATES PATENTS

| | | | |
|---|---|---|---|
| 3,321,894 | 5/1967 | Ingram | 56—295 |
| 2,697,323 | 12/1954 | Horn | 56—295 |
| 3,103,094 | 9/1963 | Cook | 56—295 |

ABRAHAM G. STONE, *Primary Examiner.*

P. A. RAZZANO, *Assistant Examiner.*